US007398324B2

(12) United States Patent
Brennan et al.

(10) Patent No.: US 7,398,324 B2
(45) Date of Patent: Jul. 8, 2008

(54) NEWS DISTRIBUTION

(75) Inventors: Anthony Brennan, London (GB);
Kathleen Elizabeth Callo, London (GB); Nicholas Grant Fulton, New York, NY (US); Dean Ratcliffe, Surrey (GB); Jeffrey Stearns, Honolulu, HI (US); Miles Jonathan Whitehead, Middlesex (GB)

(73) Assignee: Reuters Limited (GB)

( * ) Notice: Subject to any disclaimer, the term of this patent is extended or adjusted under 35 U.S.C. 154(b) by 716 days.

(21) Appl. No.: 10/181,031

(22) PCT Filed: Jan. 12, 2001

(86) PCT No.: PCT/GB01/00131

§ 371 (c)(1),
(2), (4) Date: Nov. 22, 2002

(87) PCT Pub. No.: WO01/52086

PCT Pub. Date: Jul. 19, 2001

(65) Prior Publication Data

US 2003/0140098 A1    Jul. 24, 2003

(30) Foreign Application Priority Data

Jan. 4, 2000    (GB)    ................. 0000881.3

(51) Int. Cl.
G06F 17/00    (2006.01)
G06F 17/20    (2006.01)
G06F 17/28    (2006.01)

(52) U.S. Cl. .................. 709/246; 715/264; 715/265

(58) Field of Classification Search ........... 709/203; 715/507, 508
See application file for complete search history.

(56) References Cited

U.S. PATENT DOCUMENTS 5,551,055 A * 8/1996 Matheny et al. ............. 710/62

(Continued)

FOREIGN PATENT DOCUMENTS

DE    19600522 A1 *    7/1997

(Continued)

OTHER PUBLICATIONS

United Kingdom Search Report dated Mar. 15, 2001; United Kingdom Search Report dated Dec. 21, 2000 and International Search Report dated Oct. 29, 2002.

(Continued)

Primary Examiner—Bunjob Jaroenchonwanit
Assistant Examiner—Angela Widhalm
(74) Attorney, Agent, or Firm—Banner & Witcoff, Ltd

(57) ABSTRACT

Financial news distribution apparatus comprising: a first terminal (10) comprising means (14, 17) for displaying a selected one of a plurality of data entry screens (1000) associated with news items of different types, each said data entry screen comprising: a plurality of data entry fields (1004) for entry of respective data items of a new said news item, and respective data item label text fields (1002) each containing text describing the corresponding data entry field in a source language, selection means (12) for selecting at least one of a plurality of target languages; translation means (50) for translating the source language text of said data item label text fields (1002) into corresponding text in said at least one target language; means (12) for inputting data specifying a type of news item and a subject of a new news item; a computer (30) remote to said first terminal (10), said computer (40) being arranged to read a store (40) containing a database of previous news items, accessible by type and subject, and to locate a preceding news item of the same type and on the same subject, and to transmit the stored data items thereof to the first terminal (10); said display means (14, 17) displaying each of said stored data items on said data entry screen together with the corresponding newly entered data item; and means (20, 70) for transmitting said data items and associated text in said at least one target language to at least one remote second terminal (60).

9 Claims, 7 Drawing Sheets

U.S. PATENT DOCUMENTS

| | | | |
|---|---|---|---|
| 5,608,622 A * | 3/1997 | Church | 704/3 |
| 5,764,221 A * | 6/1998 | Willard | 345/173 |
| 5,765,142 A * | 6/1998 | Allred et al. | 705/26 |
| 5,797,011 A | 8/1998 | Kroll et al. | |
| 5,828,990 A * | 10/1998 | Nishino et al. | 704/2 |
| 5,847,699 A * | 12/1998 | Kitahara et al. | 345/551 |
| 5,873,069 A * | 2/1999 | Reuhl et al. | 705/20 |
| 5,961,586 A * | 10/1999 | Pedersen | 709/201 |
| 6,044,382 A * | 3/2000 | Martino | 715/505 |
| 6,058,369 A * | 5/2000 | Rothstein | 705/10 |
| 6,078,866 A * | 6/2000 | Buck et al. | 702/2 |
| 6,085,226 A * | 7/2000 | Horvitz | 709/203 |
| 6,339,410 B1 * | 1/2002 | Milner et al. | 345/1.1 |
| 6,370,498 B1 * | 4/2002 | Flores et al. | 704/3 |
| 6,415,270 B1 * | 7/2002 | Rackson et al. | 705/36 R |
| 2002/0111890 A1 * | 8/2002 | Sloan et al. | 705/36 |
| 2003/0126068 A1 * | 7/2003 | Hauk et al. | 705/37 |
| 2004/0039996 A1 * | 2/2004 | Flam | 715/536 |

FOREIGN PATENT DOCUMENTS

| | | | |
|---|---|---|---|
| EP | 499111 | | 8/1992 |
| EP | 522095 | | 1/1993 |
| EP | 762299 | | 3/1997 |
| GB | 2315579 A | * | 2/1998 |
| WO | WO 94/15284 | | 7/1994 |
| WO | WO 97/29433 | | 8/1997 |

OTHER PUBLICATIONS

M. Miller, "PC Magazine's Technical Excellence Awards: Web Applications", PC Magazine, No. 101, Dec. 14, 1999.

http://www.pcworld.com/news/article.asp?aid=7304, "Clear Station Teaches Investment Savvy", L. Moskowitz, Aug. 29, 1998.

http://www.suntimes.com/savage/greatest_hits/webInvest1.html, "Three must-see Websites for investors", T. Savage, Sep. 8, 1998.

P. Hayes et al, "Adding Value to Financial News by Computer", Proceedings. The First International Conference on Artificial Intelligence on Wall Street, pp. 2-8, 1991. ISBN: 0-8186-2240-7.

* cited by examiner

FIG. 5

```
┌─────────────────────────────────────────────────────────────────┐
│ RTRS-TABELLE - Adidas <ADSG.DE> nennt ergebnisse im gesamtjahr  │
│                                                                 │
│   Herzogenaurach, Sep 23, (Reuters) - Gesamtjahr zum 31. Dez 1999.│
│                                                                 │
│   Konzern (in DM)          Aktuell      Vorjahr    Veränderung in %│
│   Überschuß                40,00 Mio                     100,00 │
│   Ergebnis vor Steuern     20,00 Mio                     -33,33 │
│   DVFA-Ergebnis je Aktie      10,00                       25,00 │
│   Dividendenvorschlag (Vorzugsaktie)  12,00               71,43 │
│                                                                 │
│   NB: Der vollständige Firmennamen ist Adidas-Salomon AG. Deutscher Sportartikelkonzern│
│   ((Redaktion Frankfurt, + 49 69 756525 frankfurt.newsroom@reuters.com))│
│                                                          ──3004 │
│  [FullOut] [Note]                                               │
│  USN [FRAFRA0uQDE ▼] [New USN]  USN code [Chain ▼] | □ More  [Send]│
└─────────────────────────────────────────────────────────────────┘

┌─────────────────────────────────────────────────────────────────┐
│ RTRS-TABLE - Adidas <ADSG.DE> full year results                 │
│                                                                 │
│   HERZOGENAURACH, Germany, Sep 23, (Reuters) - Full Year to 31 Dec 1999.│
│                                                                 │
│   Group (in DM)             Latest       Year Ago   Change in Pct.│
│   Net profit               40,00 Min                     100,00 │
│   Pre-tax profit           20,00 Min                     -33,33 │
│   DVFA-earnings per share     10,00                       25,00 │
│   Proposed dividend (Pref. shares)  12,00                 71,43 │
│                                                                 │
│   NOTE: The full company name is Adidas-Solomon AG. German sports brand group│
│   ((Frankfurt Newsroom, + 49 69 756525 frankfurt.newsroom@reuters.com))│
│                                                          ──3002 │
│  [FullOut] [Note]                                               │
│  USN [FRAFRA0uQEN ▼] [New USN]  USN code [Chain ▼] | □ More  [Send]│
└─────────────────────────────────────────────────────────────────┘
```

FIG. 6

| Field Code | Language 1 Text | Language 2 Text |
|---|---|---|
| 1 | Group | Konzern |
| 2 | Net Profit | Übershuß |
| 3 | Pre Tax Profit | Ergebnis vor Steuern |

FIG. 7

NEWS DISTRIBUTION

This is a U.S. National Phase Application Under 35 USC 371 and applicant herewith claims the benefit of priority of PCT/GB01/00131 filed Jan. 12, 2001, which was published Under PCT Article 21(2) in English and Great Britain Application No. 0000881.3 filed Jan. 14, 2000, respectively.

This invention relates to apparatus for news distribution, particularly but not exclusively financial news distribution.

Financial news comprises items such as company annual reports; company results announcements; company share prices; news items relating to particular companies; news items and market prices relating to market sectors (e.g. telecommunications, banking, or pharmaceuticals); commodity prices, and so on.

Modern markets rely on swift, accurate reporting of such financial news items. This is carried out by organisations such Reuters Ltd (the present applicants); Bloombergs, and a few others, who employ reporters to gather stories, write items, and supply them to a dedicated, high speed communications network for distribution to subscribers.

Each item is received as, for example, a fax from the company; a Press Release newswire message; an Internet News Service message, or a telephone call. The journalist then enters predetermined "labels" (that is, formatted alphanumeric data items) comprising, for example, an alphanumeric code indicating the company identity; an alphanumeric code indicating the type of item (e.g. results, annual report, share price); dates and times; and the data and text making up the item (e.g. "AAA announced annual profits of $BBB today (date and time)).

Next, this item compiled by the journalist (for example in the US) is transmitted via the communications network to a host of journalists in different countries (in principle, every country where there are subscribers). Each such journalist then re-writes the item into the language of the country concerned.

This process leads to significant delays, since the data needs to be keyed in twice. Further, each stage further from the source material introduces more possibilities for errors, which therefore requires additional checking. Also, the delays may not be uniform, so that the story may become available in one language (for example, that of the first journalist) before others; unless the story is withheld until the last version is available (which is unacceptable for speed reasons), one market may therefore become aware and react to a story before another (which leads to non-transparency and distortions between international markets).

The present invention is intended to alleviate one or more of these problems, and to provide an improved international news distribution system.

Accordingly, in one aspect, the present invention provides a news distribution system in which news data is input into an authoring terminal, as data associated with respective text strings ("labels"), and the labels are then automatically translated to allow immediate distribution worldwide without the need for translation in each destination country. Conveniently, the data are entered into a pre-formatted display interface.

Preferably the authoring terminal uses a browser program to access a remote central database at which the label translations are held. This avoids the need to replicate translations worldwide. It also allows the authoring terminal to be a conventional personal computer or workstation, adapted only at run-time of the invention by downloading an "applet" program for execution.

The data may also or alternatively be captured from data feeds, and the data extracted and mapped to the required text labels by parsing.

In another aspect, useful together with (or separately of) the first, the present invention provides a news distribution system in which, on input of a new news item (e.g. a company results announcement) by a user via an authoring terminal, a previous corresponding news item (e.g. the results announcement of the same company for the preceding reporting period) is retrieved and displayed as an aid to inputting the new data. This assists the user in highlighting newsworthy changes in particular data (e.g. profit), and/or errors in the entry of the new data. Conveniently, a measure of the change from the previous datum to the new datum is also calculated and displayed, for the same reasons.

Preferably the authoring terminal uses a browser program to access a remote central database at which the previous news items are held via a communications network.

This avoids the need to replicate storage worldwide. It also allows the authoring terminal to be a conventional personal computer or workstation, adapted only at run-time of the invention by downloading an "applet" program for execution. Such an applet can also perform the calculation of measures of change referred to above, thus reducing the load on the remote computer and the volume of data (e.g. results calculations) carried over the communications network.

Other aspects, embodiments, preferred features and advantages of the invention will become apparent from the following description, claims and drawings Embodiments of the invention will now be described, by way of example only, with reference to the accompanying drawings, in which:

FIG. 5 is a first screen display, allowing input of news data into the terminal of FIG. 2;

FIG. 6 is a second screen display showing the results of translation of news data input into the terminal of FIG. 2; and FIG. 7 is an illustrative diagram showing the contents of a translation database of FIG. 2.

FIRST EMBODIMENT

Figure 1:
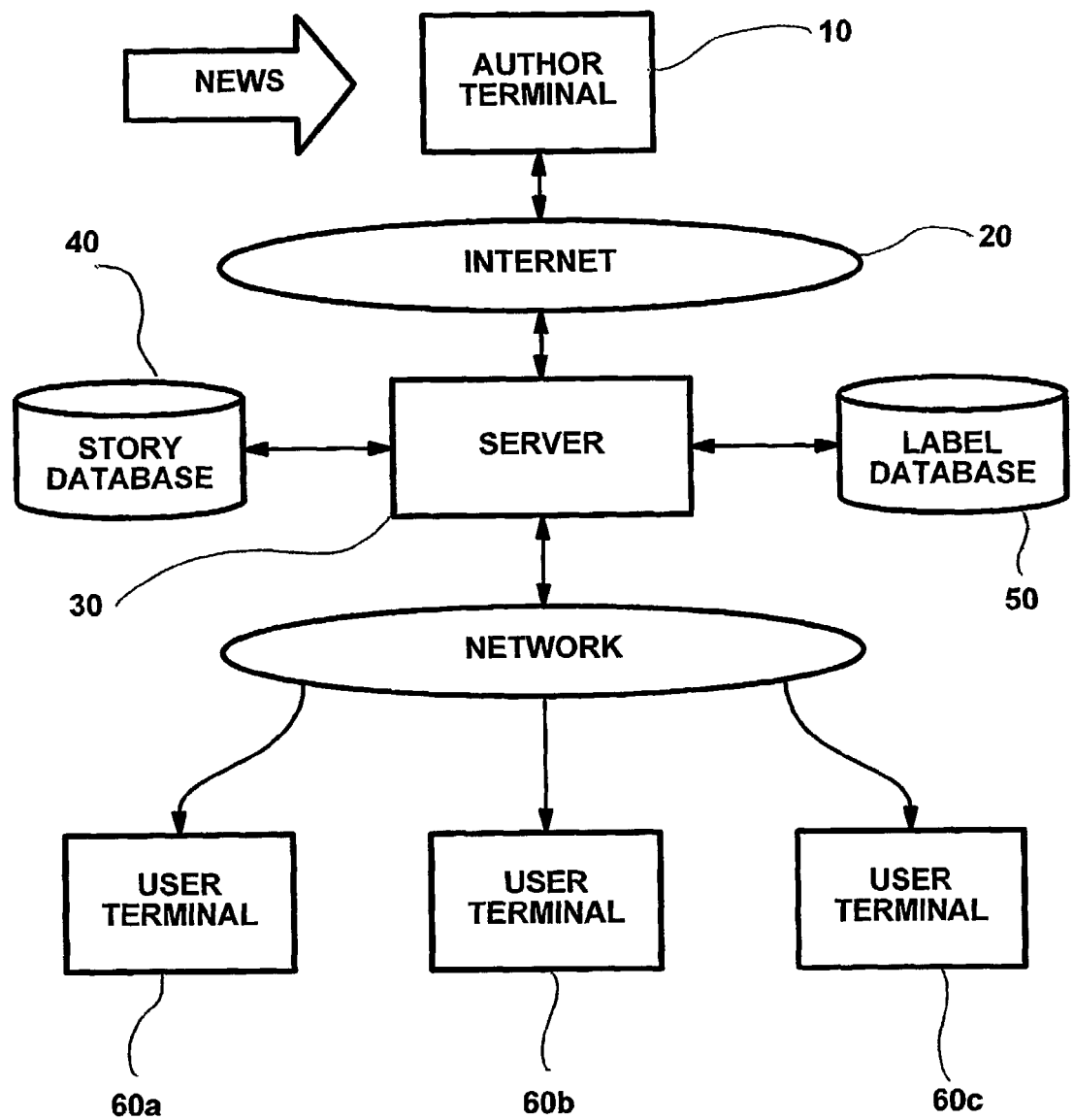
FIG. 1 is a block diagram showing the elements of a financial news distribution system of a first embodiment of the invention.

Referring to FIG. 1, a news distribution network in this embodiment comprises an authoring terminal 10, interconnected via the Internet 20 with a server computer 30. The server computer 30 is arranged to read a story database and a label database 50, which may be provided as stored files on permanent memory (such as hard disk drives) at the server computer 30.

The server computer 30 is also connected with a plurality of user terminals 60a, 60b, 60c via a news distribution network 50. The news distribution network 50 may be the same as, or different to, the network 20. In particular, it may comprise the Internet, and may also or alternatively comprise satellite links or leased lines.

Figure 2:
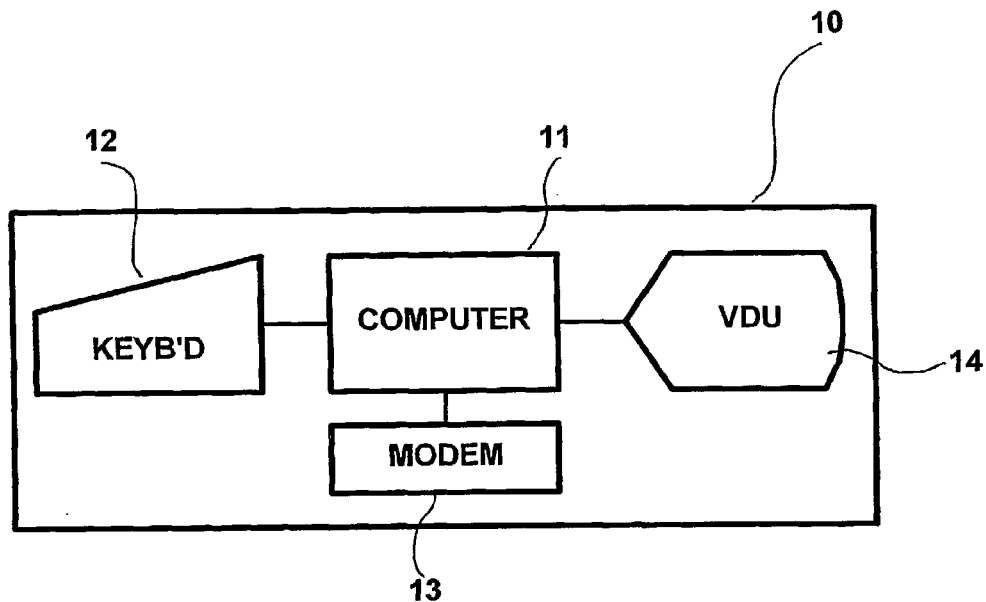
FIG. 2 is a block diagram showing the elements of an authoring terminal of FIG. 1.

In greater detail, referring to FIG. 2, the authoring terminal 10 comprises a personal computer or a workstation, comprising the conventional elements of a microprocessor, random access memory, and storage such as a disk drive (collectively indicated as computer 11), together with input devices 12 such as a keyboard for typing text, and a mouse for selecting portions of a screen display 14. It is interconnected with the Internet 20 via a modem 13 and telephone line, or an ISDN line and ISDN terminal adapter, or equivalent means.

Figure 3:
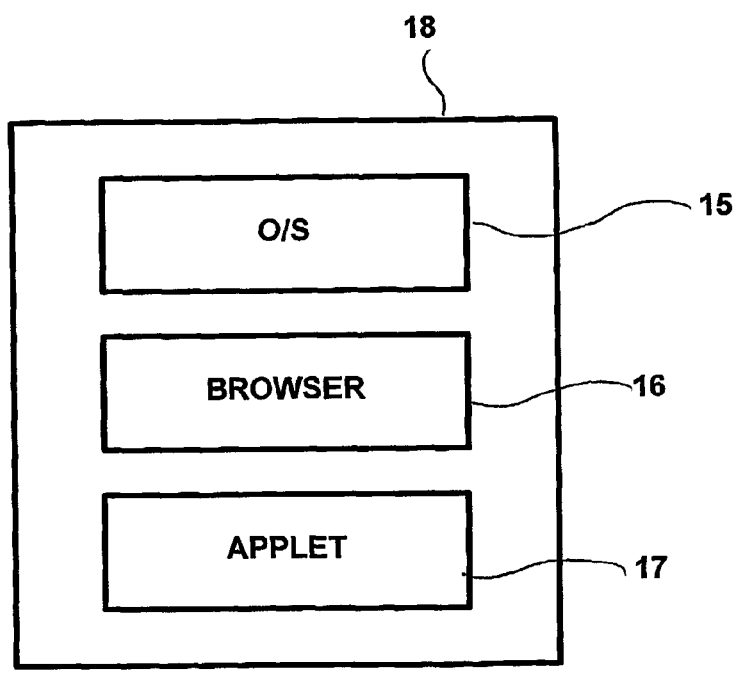
FIG. 3 is an illustrative diagram showing the programs present in operation of the terminal of FIG. 2.

Referring to FIG. 3, in operation of the terminal 10, the memory 18 of the computer 11 contains an executing operating system 15 such as Windows NT or Windows 2000, available from Corporation of Seattle, US (website http://www.microsoft.com).

Also executing is a hypertext browser program 16 (such as Internet Explorer 5™ or Netscape Navigator 4™), freely available from, respectively, Microsoft Corporation of Seattle, US, (website http://www.microsoft.com) and Netscape Communications Corp., US (website http://www-.netscape.com).

The browser includes a Java™ Virtual Machine, capable of executing downloaded applets 17 (i.e. downloadable programs written in the Java™ language, details of which are available from Sun Microsystems), and a Javascript interpreter.

The server computer 30 comprises a server or mainframe computer with large scale permanent storage such as RAID (Redundant Arrays of Independent Disks). The processor of the server computer 30 operates a communications "daemon" program such as a hypertext transfer protocol daemon (httpd), and the server computer 30 stores an applet 17 for download to terminals 10, and an application program arranged to interact with the downloaded applet to access databases (e.g. through the http daemon via a cgi.bin mechanism).

The user terminals 60a, 60b, 60c are conventional and known in the art. They may comprise personal computers running programs arranged to receive news stories from the network 50, or dedicated computer terminals used for only that purpose, or television screens. Accordingly, these stories may be transmitted via the news distribution network as encoded text, or as page-based television messages.

Figure 4A:
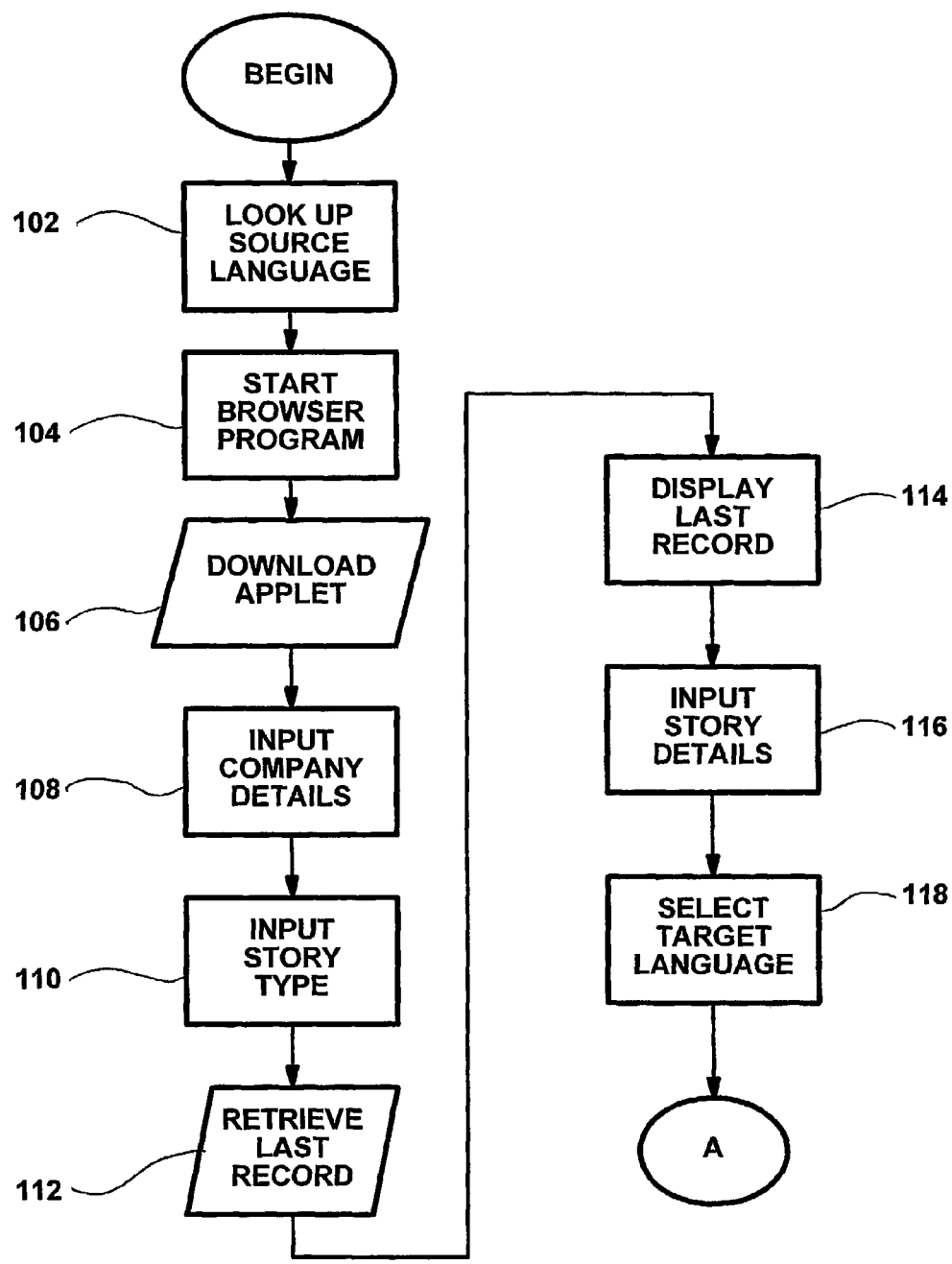
FIG. 4 (comprising FIG. 4a and FIG. 4b) is a flow diagram showing the operation of the embodiment of FIG. 1.
Figure 4B:
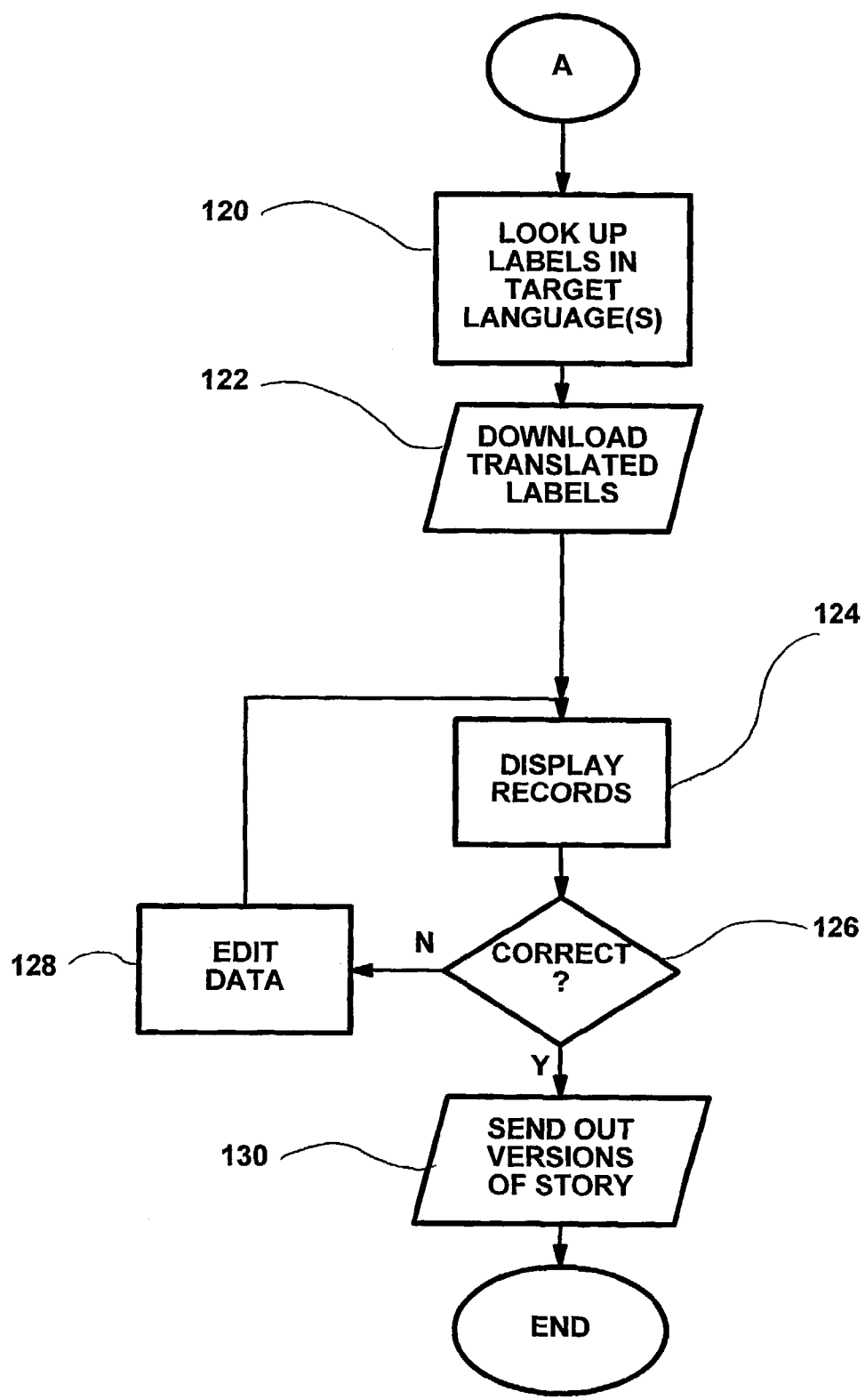

The operation of the present embodiment will now be described further with reference to FIG. 4.

Initially, an operator of the authoring terminal 10 (e.g. a journalist) receives details of a story. The details may be received in the form of a paper copy of, for example, an annual report. Equally, they may be received by email, or via an Internet website, or otherwise in electronic form.

In step 102, on the user logging onto the operating system 15 of the authoring terminal 10, the user's identity is used to retrieve a stored source language code indicating the language in which that user will input story details (previously input by the user in a user registration stage).

If no such language code is stored in relation to the user identity, a default stored source language code is used, indicating the main language of the country in which the terminal is usually located (e.g. English for terminals in the US; German for terminals in Germany).

In step 104, the operator of the authoring terminal 10 starts the browser program 16.

The browser program 16 is arranged to access the IP address of the server computer 30 via the Internet 20. The browser program transmits the stored source language code associated with the user (which may, for example, be stored in a "cookie") to the host computer 30.

Figure 5:
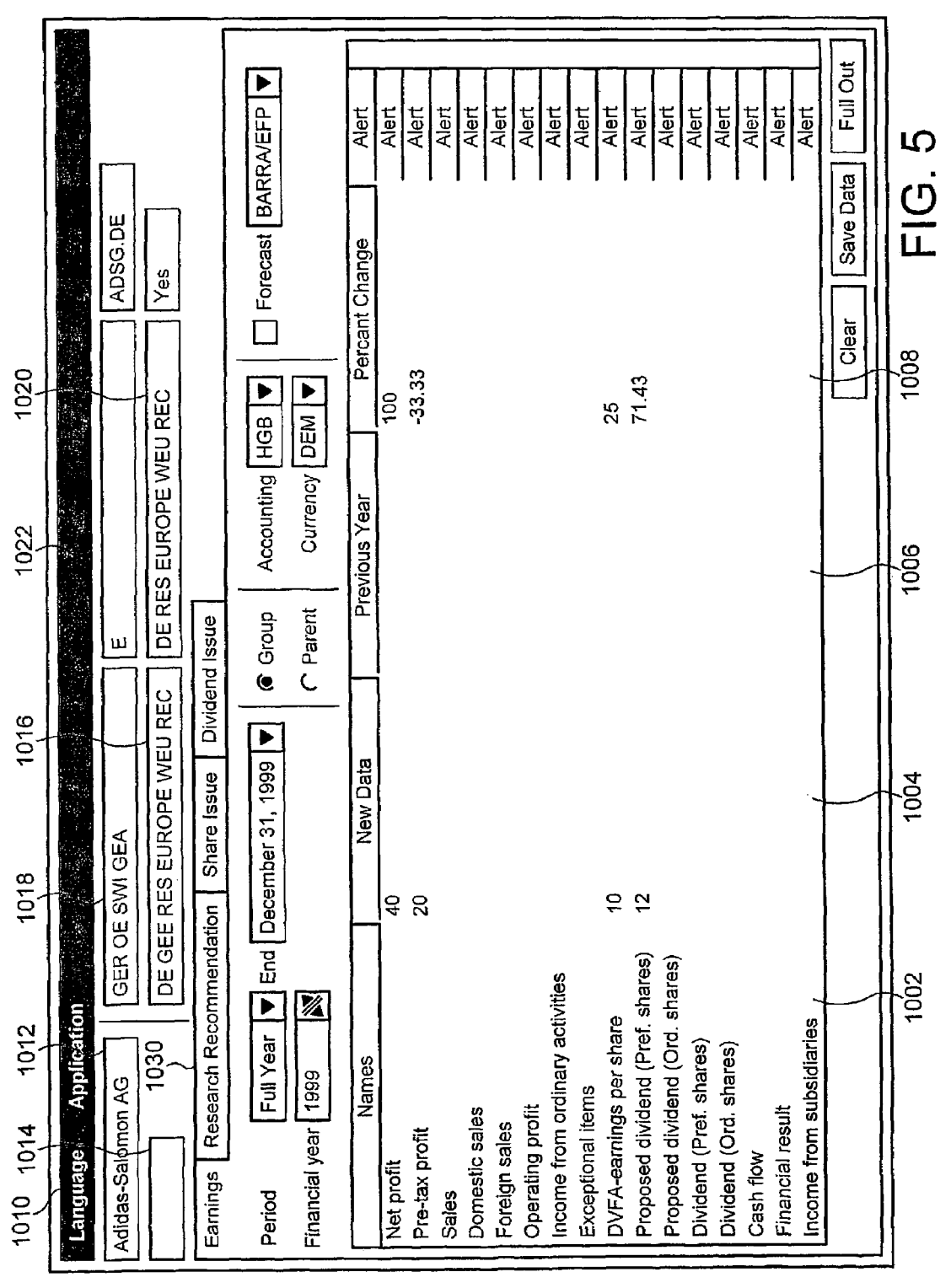

Accordingly, in a step 106, the browser program downloads therefrom a Java applet 17 (stored on the server computer 30), which causes the generation on the visual display unit (VDU) 14 of the author terminal 10 of the display screen shown in FIG. 5, with label text in the indicated source language. The display of FIG. 5 comprises an HTML form, into which the user can enter data.

As shown in FIG. 5, the display comprises a table, consisting of a first column 1002, in which are displayed a set of data field labels 1002a, 1002b . . . ; a second column 1004 in which data may be entered by the user corresponding to each of the labels; a third column 1006 into which (as will be described in greater detail below) previous corresponding data will be entered; and a fourth column 1008 in which the percentage change between respective figures in the third column 1006 and the second column 1004 is displayed.

In addition to the numeric data entry column 1004, a region 1010 is provided for inputting alphanumeric information and selections. The region comprises a field 1012 for input of a company name, a field 1014, for the input of company codes (e.g. RICs or nicknames) and fields 1016, 1018, 1020, 1022, for input of product and topic codes (e.g. describing the country and region of origin of the company, and the products it makes, to allow subscription by terminals 60a, 60b . . . . to particular topics such as companies and/or products).

Also provided is a selection area 1030, comprising tabs 1032a-1032d for selecting the type of storing (e.g. a periodic report of company earnings 1032a; a research recommendation 1032b; a share issue 1032c; or a dividend issue 1032d).

Associated with each of the tabs 1032a-d are one or more selection fields. As shown in FIG. 5, associated with the display shown are a number of selection fields comprising drop down lists or radio buttons; those associated with the earnings tab comprise a drop down list allowing selection of the reporting period (e.g. full year, half year or quarter); the financial year (e.g. 1999); the period end (e.g. Dec. 31, 1999); radio buttons for selecting between group and parent company accounts; a drop down list field allowing selection of accounting method (e.g. HGB); and a drop down list allowing selection of currency (e.g. Deutsche Mark).

Likewise, the fields (and the associated text for each field) 1002 displayed are also associated with the selected tab.

The server computer 30 retrieves the text for each field (i.e. the data field labels) from the label database 50 in the source language associated with the user, which has previously been transmitted from the authoring terminal 10 to the server 30.

Thus, the display of FIG. 5 always appears on the authoring terminal 10 in the language desired by the user, allowing (for example) an English language speaker to enter company results for a German company on an authoring terminal in Japan.

Initially (step 108), the user enters company information in the company or company code fields of the area 1010, and selects the tab of the area 1030 for the desired story type (step 110), using the keyboard and mouse 12 of the authorising terminal 10.

In response, in step 112, the applet and browser program signal the company and story type data back to the server computer 30. In step 114, the server computer 30 accesses the story database 40 and reads the most recent previous data for the same story type and the same company. For example, where the story type is a quarterly report, the server computer 30 retrieves the previous quarterly report for that company.

The server computer 30 then transmits the previous story data to the authoring terminal 10, at which the applet causes the display in the previous data column 1006 (step 114).

Next, the new story data is entered by the user in the fields of the data column 1004 using the keyboard and mouse 12.

As each datum is entered in a field of the column 1004, the applet calculates the percentage change from the corresponding previous period datum in the field 1006 (i.e. (new-old)

*100/(old))and displays the calculated change in the corresponding field of the column 1008.

Since the previous period data is available during data entry and, more conveniently, the percentage change is calculated and displayed, the user is able to see significant discrepancies or changes which might indicate either a data entry error, or a newsworthy point. If any erroneous data is observed it is overtyped in the display form, and the percentage change recalculated and redisplayed by the applet.

The user can also optionally enter freeform text in a note field (not shown in FIG. 5).

When all desired data has been entered, the user specifies the target language(s) (step 118) into which the news item is to be translated using the keyboard or mouse to activate a menu selection (not shown) on the display screen. For example, German may be selected as the target language.

FIG. 7 shows schematically the contents of the label database 50. It consists of a plurality of records 2002, 2004, 2006 . . . ; one for each of the data entry fields of each possible story type. Each of the records (for example, record 2002) consists of a plurality of fields 2002a, 2002b, . . . , each of which contains the text to describe the field (i.e. the field label) in each of a plurality of languages. For example, fields 2002a may contain the English text "group" and field 2002b may contain the corresponding German language text "Konzern".

In step 120, the server computer accesses the record for the story type in the label database 50, and reads, for each label, the text from the field for the desired target language. The or each set of target language labels are returned to the authoring terminal 10 by the server computer (step 122).

In step 124, the applet generates the display of FIG. 6, showing the numeric data and associated field labels in each of the source and target languages (areas 3002 and 3004 respectively), in the format of a news item. If the details appear correct (assessed by the user in step 126), the user actuates a button indicating that the story in each language is to be distributed, causing the applet 17 and browser 16 to upload the story details in each language (i.e. the field labels for those fields containing data; the field data items; and the percentage change values) to the server computer 30. In this embodiment, any associated free text notes are transmitted in the source language, not translated automatically.

The server computer 30 records the story into the story database 40, in both the source and target languages.

It also distributes (step 130) the story via the network 70 to the user terminals 60a, 60b, 60c; typically to those secondary terminals which have "subscribed" to stories having one or more of the topic codes entered as part of the story (and identifying, for example, a company or industry sector).

Each different language version of the story is assigned a serial number indicating it's language (for example, a story number common to all language versions followed by a two letter language code). This permits user terminals 60a, 60b, 60c to receive stories in only the desired language of the user thereof.

If further editing is required, the user returns to the screen of FIG. 5 (by actuating an onscreen button) and re-enters the data as required (step 128), returning to step 124 on completion.

SECOND EMBODIMENT

In the second embodiment, the authoring terminal 10 is adapted to receive, additionally, streams of financial news data in predetermined formats from, for example, a wire service or a broadcast. The terminal 10 runs a parser program (not shown) which detects the data elements within the stream.

For example, a story having the format shown in FIG. 6 may be received electronically (e.g. as an e-mail message); in this case, the parser program is operable to compare the text of the story with a stored set of label texts, and thus to identify the label to which each following numeric item corresponds.

Equally, the same story may be received as a fax message, in which case an initial conversion to text (and numeric data) is performed by the parser program prior to the text matching described above. Other forms of input (such as voice) are likewise initially converted to text prior to text matching.

Where data is provided in an identifiable format specific to a particular story type, the parser program need only identify the story type by text matching, and then map the story data from it's position within the story (e.g. row or column) to a particular field.

This embodiment is conveniently utilised in combination with the first, so that the parser program is operable to extract the numerical data from a source story and insert them into the fields of the display of FIG. 5, allowing the user of the authoring terminal to check and, if necessary, amend or reposition the data in different fields before uploading it to the server computer 30 (to allow for the possibility of mis-recognition of the data by the parser program). However, it could be used independently of the first embodiment where the source story has data in a consistent and easily-parsed format, so that misrecognition is unlikely.

OTHER EMBODIMENTS

It will be apparent to the skilled person that various alternatives or modifications to the above-described embodiments could be employed.

For instance, it would be possible to employ a "dumb" terminal instead of a computer as the authoring terminal. However, for widespread news networks, it is preferable to use an intelligent authoring terminals 10 in newsrooms worldwide, in discontinuous communication with one or more server computers via the Internet or other network, to reduce the bandwidth and cost required by a dedicated wide area network.

Special programs could be provided on each authoring terminal 10. However, it is more convenient to provide that the authoring terminal uses a conventional browser program (such as Microsoft Internet Explorer Version 4 or 5, or Netscape Navigator version 4) capable of downloading and executing applets or scripts, and to provide that the server computer 30 downloads an applet to cause the execution of the desired functions (in other words, to adapt a general purpose computer to be the authoring terminal 10). This reduces the effort required to distribute and update programs, since the applet is stored on a single central site.

It would be possible to combine the functions of the authoring terminal 10 and server computer 30, thus giving each authoring terminal the capability of performing translations. However, it is here preferred to use one label database (or a small number thereof), thus reducing the amount of storage required at each terminal and the effort in updating the database to, for example, add a new language or change the text of a label. Conveniently, this database 50 is at, or forms part of, the server computer 30, although it could be located elsewhere and remotely accessed.

It would be possible to provide the translation of the present invention separate of the retrieval of previous story data, and vice versa. However, it is convenient to provide both together, particularly where a terminal 10 accessing a central server 30 is provided.

Clearly, different components of the invention could be separately located, and even located in different jurisdictions. The present invention is intended to encompass any inventive such components, regardless of the presence of the others within the jurisdiction.

Many other variants and modifications will be apparent to the skilled reader, and all are to be considered as within the scope of the present invention.

The invention claimed is:

1. A financial news distribution system comprising:
   a first terminal computer comprising means for displaying a selected one of a plurality of data entry screens associated with news items of different types, each said data entry screen comprising;
   a plurality of data entry fields for entry of respective data items of a newly-entered news item; and
   respective data item label text fields each containing text describing the corresponding data entry field in a source language;
   means for inputting data specifying a type and a subject of the newly-entered news item;
   a server computer remote to said first terminal computer, said server computer being configured to perform actions comprising:
   reading a store containing a database of previously-stored news item accessible by type and subject;
   locating a previously-stored news item of the same type and on the same subject as the newly-entered news item;
   deriving target language data item labels for the newly-entered news item based on the corresponding previously-stored news item including translating the source language text of said data item label text field into corresponding text in said at least one target language; and
   transmitting the target language newly-entered news item labels to the first terminal computer without transmitting a remainder of the newly-entered news item in the target language;
   said display means displaying each of said previously-stored data items on said data entry screen together with the corresponding newly-entered data item, said display means being configured to calculate a change between a newly-entered data item and the corresponding previously-stored data item, and to display said change together with said newly-entered data item;
   selection means for selecting at least one of a plurality of target languages; and means for transmitting, to at least one remote second terminal computer, the target language newly-entered news item labels and the newly-entered news item data items.

2. A system according to claim 1, wherein translating the source language text of said data item label text field comprises storing a database containing, for each data item label text field, a plurality of fields storing corresponding text strings in each of a corresponding plurality of alternative languages.

3. A system according to claim 1, in which the means for displaying is arranged to select said source language from a plurality of languages.

4. A system according to claim 1, in which the remote server computer is arranged to execute a hypertext server program, and the first terminal computer is arranged to execute a hypertext browser program to access the remote server computer.

5. A terminal computer for executing a program arranged to:
   receive a newly-entered news item;
   generate a display in a source language;
   download previously-stored news data corresponding to the newly-entered news item from a remote computer;
   derive labels for the newly-entered news item based on the corresponding previously-stored news data;
   display at least one of said corresponding news data and the labels derived therefrom;
   input news data for the newly-entered news item;
   input a choice of target language;
   download translated labels for the news data in said target language from the remote computer without downloading a remainder of the newly-entered news item in said target language;
   calculate a change between a data item of the news data for the newly-entered news data and the corresponding downloaded data item for the previously-stored news item; and
   display the labels in said source language and said target language and said input news data in said source language for review.

6. A computer-implemented method performed by a server computer, the method comprising:
   receiving a newly-entered news item having data items;
   receiving input data specifying a type and a subject of the newly-entered news item;
   reading a store containing a database of previously-stored news items, accessible by type and subject;
   locating a previously-stored news item of the same type and on the same subject as the data items of the newly-entered news item;
   transmitting the previously-stored data items thereof to a first terminal computer;
   deriving data item label text fields for the data items of the newly-entered news item based on the data item label text fields for the previously-stored data items;
   receiving a selection of at least one of a plurality of target languages;
   translating source language text of said data item label text fields into corresponding text in said at least one target language;
   transmitting the target language newly-entered news data item labels to the first terminal computer without transmitting a remainder of the newly-entered news item in the target language;
   calculating a change between a newly-entered data item and the corresponding previously-stored data item, and to display said change together with said newly-entered data item; and
   transmitting said data items of the newly-entered news item and associated text in said at least one target language to at least one remote second terminal computer.

7. The method of claim 6, wherein the step of translating comprises storing a database containing, for each data item label text field, a plurality of fields storing corresponding text strings in each of a corresponding plurality of alternative languages.

8. The method of claim 6, wherein the step of displaying comprises selecting said source language from a plurality of languages.

9. A computer according to claim 5, wherein the program is further arranged to:
   receive a user's log in information identifying the user; and
   based on the log in information, retrieve a source code language for the language in which the user will input the newly-entered news item.

\* \* \* \* \*